March 17, 1942.  E. W. KELLOGG  2,276,494
WEB FEEDING APPARATUS
Filed Oct. 31, 1939
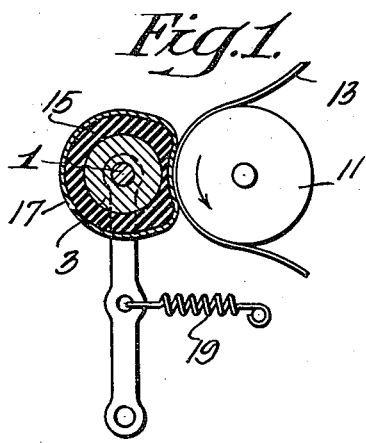
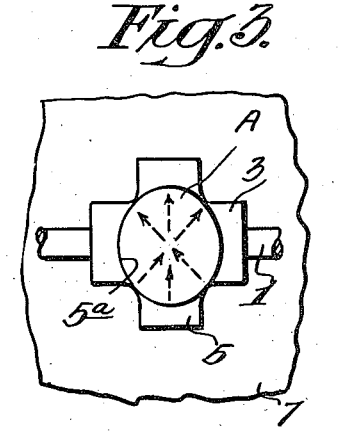
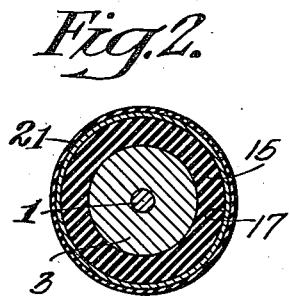
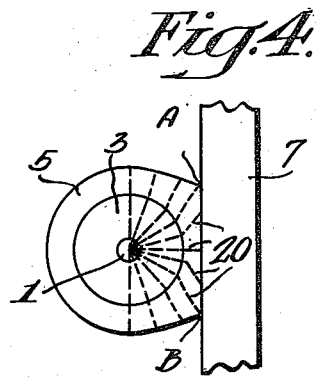
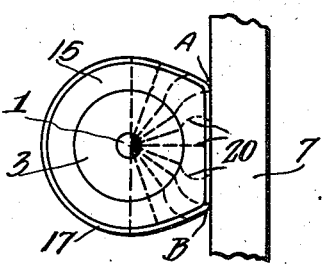
Inventor
Edward W. Kellogg
By
Attorney Patented Mar. 17, 1942

2,276,494

UNITED STATES PATENT OFFICE 2,276,494

WEB FEEDING APPARATUS

Edward W. Kellogg, Moorestown, N. J., assignor to Radio Corporation of America, a corporation of Delaware Application October 31, 1939, Serial No. 302,261

8 Claims. (Cl. 271—2.3)

This invention relates to web feeding apparatus, and more particularly to a pressure roller for holding a strip or web, such as a flexible film of the type used in sound recording, sound reproducing, and/or sound printing apparatus, against an arcuate support.

Heretofore, it has been the general practice in devices in which film is to be held in contact with a drum without slipping to either depend upon maintaining the film under constant tension, or provide one or more pressure rollers which hold the film against the drum, the pressure rollers being, in most cases, provided with soft tires so as to insure continuous contact (that is, freedom from bouncing), and to avoid too concentrated pressure. The objection to depending on film tension is that the very means of producing the tension increases the tangential forces which may make the film slip, this difficulty being increased by the fact that it has not been found practically possible to obtain high coefficients of friction between the drum and the film. For best insurance against slipping, dependence has been placed on soft pressure rollers.

When pressure is applied through a soft tire such, for example, as a solid rubber tire, the rubber is squeezed from the center toward the outer edges of the area of contact. As the tire rotates against the part with which it is in contact, the movements on the side where the pressure is increasing are in the direction of rolling, while on the back side, where the pressure is diminishing, the rubber surface creeps back toward the center, which is again in the direction of rolling. The friction of the rubber on the surface is therefore almost entirely in the direction of rolling; or if the roller is stationary and the web is moving, it is opposite to the direction of motion of the web or film. This produces a backward drag on the film as it passes under a pressure roller, and this backward drag increases the danger of slipping. This friction is furthermore objectionable in that any friction tends to impair the uniformity of motion of the film. The frictional force or drag due to the soft tire may be largely avoided by using a hard tired roller, but any roller which applies a concentrated pressure produces a creeping tendency. In the case of a film, a slight loop of flexible material comes up in front of the roller and, as this loop moves along, a continuous displacement takes place. A well-known example of this effect is the creeping of rails under heavy one-way traffic. Such a creeping tendency is avoided by eliminating the concentrated pressure in favor of a widely distributed pressure.

The primary object of my present invention is to provide an improved pressure roller which will combine the advantages of the low friction of the hard tired roller with the distributed pressure of the soft tired roller.

More particularly, it is an object of my present invention to provide an improved pressure roller by means of which it will be possible to obtain satisfactory adhesion between a film and a drum over which the film passes.

Another object of my invention is to provide an improved pressure roller which will exert a minimum frictional drag on the film or web while applying a normal pressure which is distributed over an appreciable area.

Still another object of my present invention is to provide an improved pressure roller by means of which the danger of slipping will be reduced.

A further object of my present invention is to provide, in web feeding apparatus, an improved pressure roller by means of which the danger of abrasions on the web or film will be greatly reduced.

Still a further object of my present invention is to provide an improved pressure roller as aforesaid by means of which it will be possible to more evenly distribute the pressure applied thereby.

Another object of my present invention is to provide an improved web feeding apparatus by means of which the web may be advanced with more constant speed.

It is also an object of my present invention to provide an improved pressure roller as aforesaid which is very simple in construction, which can easily be fabricated, and which is highly efficient in use.

In accordance with my present invention, I provide a roller with a soft tire covered with a flexible but substantially inextensible material, such as cloth. The tire may be made of soft rubber, and since the cloth covering would considerably stiffen a rubber tire of given dimensions, it would be necessary to compensate for this by making the rubber portion thicker. A softer tire than would otherwise be desirable may be employed for the reason that this distributes the pressure over a larger area, while the presence of the cloth covering reduces the objections to an extremely soft tire. When pressure is applied to a soft solid rubber tire the tread of which is covered with cloth, the rubber is displaced tangentially and sideways, as in the case of conventional, uncovered tires, but the surface of the tire is only bent and not stretched, and it bears against the mating surface like a short stretch of belt. There is, therefore, no appreciable rubbing between the surface of the tire and the surface over which it is running. Such a tire has a much higher resilience (in other words, low energy loss) than a simple rubber tire of the conventional type, owing to the absence of frictional losses. Another advantage which my improved cloth-covered tire affords is that there is considerable reduction of abrasion on the film.

The novel features that I consider characteristic of my invention are set forth in particularity in the appended claims. The invention itself, however, both as to its organization and method of operation, as well as additional objects and advantages thereof, will best be understood from the following description of several embodiments thereof, when read in connection with the accompanying drawing, in which Figure 1 is a side elevation of a web feeding apparatus employing one form of my present invention, Figure 2 is a sectional view of a modified form of my present invention, Figure 3 is a plan view of a system employing a conventional form of pressure roller, Figure 4 is a side elevation thereof showing the distortion of the conventional rubber tire of the pressure roller when applying pressure to a web or film, and Figure 5 is a view similar to Fig. 4, but showing my improved pressure roller and the displacement which takes place therein when applying pressure to a web or film.

Referring, first, to Figs. 3 and 4 of the drawing, which have been included in order to enable a clearer understanding to be had of the nature and advantages of my present invention, there is shown a shaft 1 carrying a hub 3 on which is mounted a soft rubber tire or roller 5 of the conventional type. If a flat plate 7 (for example, a sheet of glass) were placed against the rubber tire 5, it would be noted that the rubber would be squeezed from the center toward the outer edges to assume the somewhat elliptical shape 5a at the area of contact between the rubber tire 5 and the glass plate 7, as shown clearly in Fig. 3, which shows what would be seen if an observer looks at the roller through the glass plate. If the roller 3 rolls on the plate 7 in an upward direction, or if the plate 7 moves downwardly, the rubber tire 5 is continuously becoming compressed at the point A and is being relieved at the point B (Fig. 4), and the directions of the sliding movement of the various parts of the rubber on the glass plate 7 are shown by the small arrows in Fig. 3. The nature of the distortion in the shape of the rubber is indicated by the bending of the radial lines in Fig. 4. These represent lines through the rubber which, in the absence of strain or deformation, would be radial. The increase in their separation at the point of maximum pressure indicates the circumferential stretching of the rubber at this point. It will be seen that a given portion of the surface, after it first comes in contact with the plate, first stretches and then contracts as the roller progresses. In addition to the longitudinal stretching and contraction of the surface, there is a sidewise stretching and contracting movement. All of these cause friction and resistance to rolling.

In order to obviate the friction, I have provided the rubber tires shown in Figs. 1 and 2 of the drawing. In Fig. 1, I have shown a drum 11 around which passes a film 13 held in contact therewith by a pressure roller comprising a cylindrical hub 3 surrounded by a rubber tire 15 encased within a layer 17 of flexible, but inextensible material, such as cloth. The rubber tire 15 may be mounted on the hub 3, as in the case of conventional rollers, and may be held in engagement with the film 13 by means of a spring 19. Since the cloth covering 17 is inextensible, it is obvious that the surface of the rubber cannot stretch, although it will be permitted to bend inasmuch as the cloth layer 17 is flexible, and it can yield in compression. Hence, although the rubber is displaced tangentially and sideways, as in the case of the uncovered tire, there is no appreciable rubbing between the surface of the tire and the surface of the film 13. The nature of the deformations within the body of the tire is indicated by the radial lines 20 in Fig. 5.

In the modification of my invention shown in Fig. 2, the rubber tire 15 is also encased within the layer of cloth or other inextensible material 17, and the latter is surrounded by a very thin layer or skin of homogeneous, flexible material 21, such as rubber, for example, which may be employed to provide better traction, or better wearing qualities or smoother surface. It will be noted, however, that by far the major portion of the composite rubber tire of this modification is encased within the cloth layer 17, and the outer layer 21 is so thin that it cannot be stretched appreciably, being restrained therefrom by the inextensible layer 17. In either form of my invention, the cloth layer 17 may be secured to the rubber by an adhesive, by vulcanization, or in any other suitable manner.

It has long been common practice to incorporate layers of cloth in pneumatic tires, but this is for an entirely different purpose, namely, to assist the walls to stand the internal pressure. The air within the tire can flow freely from one part of tire to the other without affecting the surface, but in the case of a solid rubber tire, the corresponding flow of rubber causes stretching movements at the surface, unless this stretching is prevented by an inextensible layer in accordance with my invention. The inextensible layer is, in my invention, preferably placed only on the outer or cylindrical portion of the surface, and not the sides. Thus, the rubber is not completely encased by this layer.

From the foregoing description, it will be apparent to those skilled in the art that I have provided a novel pressure roller which has numerous advantages not present in rollers of the prior art. Although I have shown and described but two embodiments of my invention, I am fully aware that many other modifications thereof, as well as changes in those described, are possible. Consequently, I desire that my invention shall not be limited except insofar as is made necessary by prior art and by the spirit of the appended claims.

I claim as my invention:

1. A pressure roller for web feeding apparatus comprising a relatively soft, resilient, cylindrical member, and a layer of flexible, substantially inextensible material covering the outer portion of said member.

2. A pressure roller for web feeding apparatus comprising a relatively soft, resilient, cylindrical member and a peripheral layer of flexible, substantially inextensible material partially encasing said member.

3. A pressure roller for web feeding apparatus comprising a relatively soft, resilient, cylindrical member, a layer of flexible, substantially inextensible material encasing said member, and a thin layer of homogeneous flexible material surrounding said inextensible material.

4. A pressure roller for web feeding apparatus including a tire of solid, flexible material having an outer tread or surface designed to make contact with and exert pressure against said web, said tread being reinforced by a layer of substantially inextensible flexible material disposed substantially adjacent to the surface of said tread.

5. A pressure roller for web feeding apparatus comprising a cylindrical member of soft rubber encased in a coating of substantially inextensible cloth.

6. A pressure roller for web feeding apparatus comprising a cylindrical member of soft rubber encased in a layer of substantially inextensible cloth and a thin layer of rubber surrounding said cloth layer.

7. In a web feeding apparatus, the combination of an arcuate web support, a web passing around said support, a soft rubber roller for maintaining contact between said web and said support, and means for causing the surface of said roller to bend as distinguished from being stretched when said roller is brought into engagement with said web to hold said web against said support.

8. A pressure roller for web feeding apparatus comprising a relatively soft, resilient, cylindrical member and a layer of flexible, substantially inextensible material surrounding said member.

EDWARD W. KELLOGG.